Patented Nov. 8, 1927.

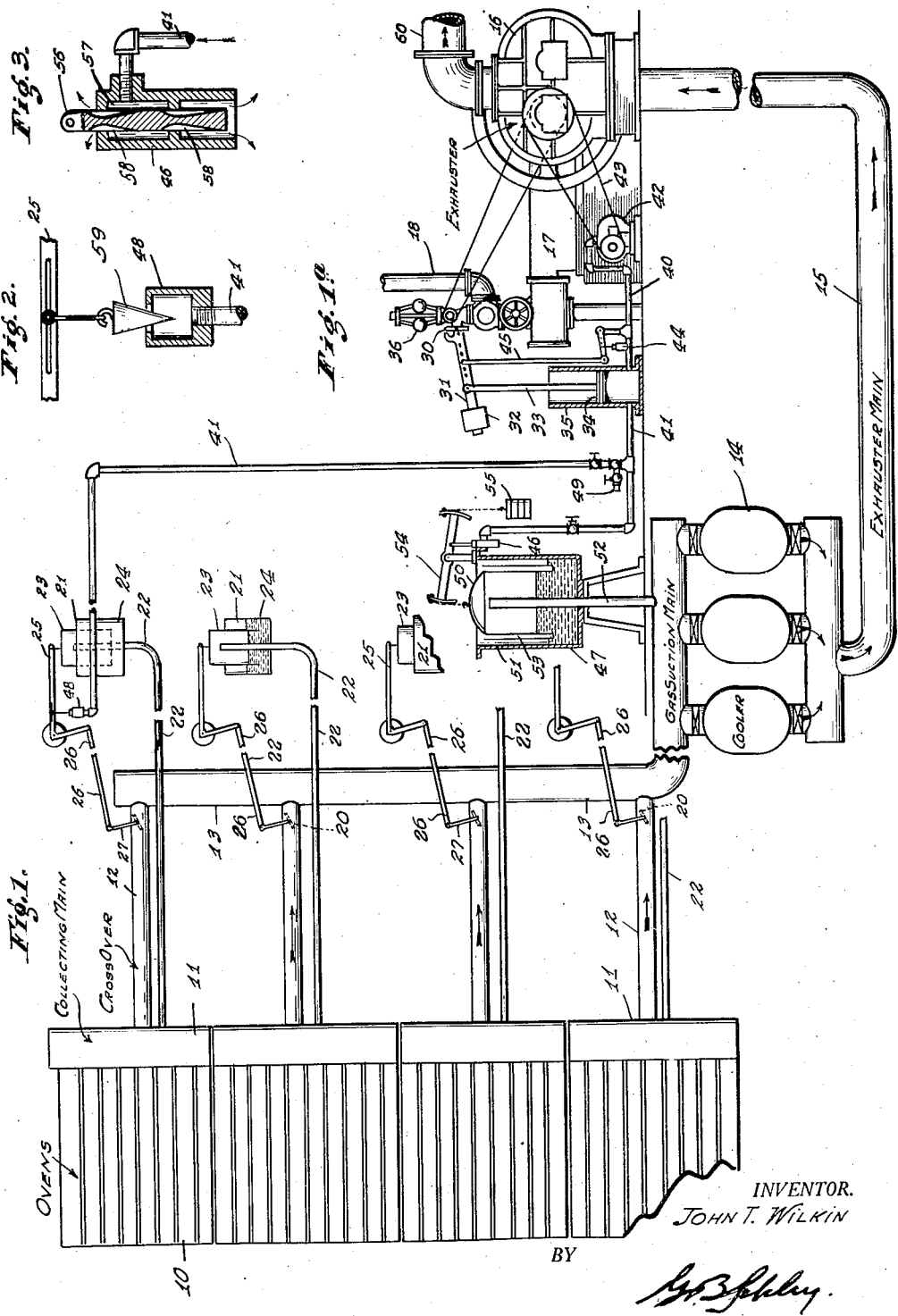

1,648,522

UNITED STATES PATENT OFFICE.

JOHN T. WILKIN, OF CONNERSVILLE, INDIANA, ASSIGNOR TO THE CONNERSVILLE BLOWER CO., OF CONNERSVILLE, INDIANA, A CORPORATION OF INDIANA.

MULTIPLE CONTROL GOVERNOR FOR GAS OR COKE OVEN SYSTEMS.

Application filed March 23, 1925. Serial No. 17,621.

It is the object of my invention to produce harmony of action between the collecting-main governor or governors and the exhauster governor in gas plants and by-product coke-oven plants, and to minimize "hunting" and interference between governors.

In multiple coke-oven systems, the ovens are divided into batteries, each of which has its own collecting main. The gas collecting mains discharge by their own individual crossover mains into a common suction main. A collecting-main governor is provided to be responsive to the pressure in each collecting main, and to open or close a valve in the associated crossover main as the pressure in its collecting main rises or falls, in an attempt to maintain as nearly constant as possible the pressure in the collecting mains; since such constancy of pressure is very desirable for proper results, and the variation in such collecting-main pressure should not exceed one or two millimeters of water column.

From the suction main, the gas is carried through coolers to an exhauster main, which leads to the intake of an exhauster. The exhauster is usually equipped with a variable-speed governor, which has been controlled in various ways; with the idea of increasing and decreasing the exhauster speed to correspond with the quantity of gas supplied to it. In the past the exhauster has been controlled by a constant-pressure governor responsive to the pressure in the suction main just ahead of the coolers; but this does not fully meet the conditions. The normal pressure in the collecting mains should be a few millimeters of water above atmospheric pressure, and is the thing which must be maintained as nearly constant as possible; and the pressure at the intake of the exhauster is usually below atmospheric pressure to provide the necessary differential pressure to move the gas and overcome the friction through the mains. The differential pressure necessary for this varies with the amount of gas being moved, so that the maintenance of a constant suction just ahead of the coolers may mean a considerable variation in pressure in the collecting mains under different conditions. This is especially the case upon turning in a freshly charged oven, as that produces a strong puff in the associated collecting main, by increasing very suddenly the volume of gas flowing into that collecting main, and thus tending to increase the pressure in all the ovens of that battery. The associated collecting-main governor attempts to take care of this by opening the valve in the associated crossover main; but this in turn tends suddenly to raise the pressure in the suction main, and causes a readjustment of neighboring collecting-main governors, producing what are termed "governor interference" and "hunting" between the several governors. In addition, the increased flow of gas increases the frictional loss; so that to maintain the movement of gas under these conditions of increasing supply it is necessary to lower slightly the pressure just ahead of the coolers; which cannot be done if the control of the exhauster is to maintain a constant pressure at that point. Moreover, there is always a certain lag in the action, not only in the change in the speed of the exhauster but in the actual transmission of the effect of pressure changes from one part of the system to another; so that if the control on the exhauster is not exerted until change in gas pressure reaches the entrance to the coolers, the delay is so great that the desired correction lags considerably behind the changed condition which requires such correction.

In carrying out my invention, I modify the action of the exhauster governor, harmonize its action with the collecting-main governors, and to some extent cause it to anticipate direct demands on it, by interconnecting the exhauster governor with one or more collecting-main governors, desirably the one farthest removed from the exhauster.

While this can be done in various ways, I desirably do it by a modification of the system shown in the patent of Carl R. Houghton, No. 1,440,297, granted December 26, 1922; fundamentally by providing in the Houghton system one or more additional air-leaks responsive to one or more collecting-main governors.

The accompanying drawing illustrates my invention: Figs. 1 and 1ª together constitute a diagram showing a system as a whole equipped with my invention, Fig. 1 showing the ovens and certain of the connections thereto in plan, and Fig. 1ª showing the governors and the exhauster in part in elevation and in part in vertical section, and the two figures being inter-related so that adjacent parts of the same members appearing in the two figures are in line; and Figs. 2 and 3 are details of air-leak valves, shown in vertical section.

The ovens 10 are shown arranged in several batteries, with a separate collecting main 11 for each battery; and the several collecting mains are connected by separate cross-over mains 12 to a common gas suction main 13. From the gas suction main the gas passes through coolers 14, of which there may be several in parallel, to an exhauster main 15, which leads to the intake of the exhauster 16. As shown, the exhauster is driven by a steam engine 17, supplied with steam through a steam-supply pipe 18.

In each crossover main 12 there is a control valve 20, forming part of and operated by a suitable collecting-main governor 21 responsive to the pressure in the associated collecting main 11. For simplicity I have illustrated this diagrammatically, without the pilot-valve mechanism which is usually provided on account of the smallness of the changes in the controlling pressure. As thus diagrammatically shown, the collecting-main governor is of the floating-bell type, wherein a pipe 22 from the collecting main 11 opens beneath a bell 23 dipping into a suitable liquid, such as oil or water, in a vessel 24; which bell directly or indirectly (directly as shown) operates a bell-crank 25 connected by a link 26 to the operating arm 27 of the associated valve 20. When the pressure in a collecting main 11 rises, as because a freshly charged oven is turned in, the resultant rise of the bell 23 of the collecting-main governor acts to open the associated valve 20; which permits a greater flow of gas from that collecting main through the crossover main 12 into the gas suction main 13, to tend to restore the pressure in the collecting main to normal. When such pressure falls, the reverse series of actions occurs.

The supply of steam for the exhauster-operating engine 17 may be controlled by a lever 30, which may be any suitable control lever for any desired kind of engine control. The lever 30 is operable by an arm 31 provided with a counterweight 32; and the arm 31 is connected to the piston-rod 33 of a piston 34 movable vertically in a cylinder 35, so that when the piston 34 rises the arm 31 moves the lever 30 to reduce the engine speed, and vice versa. The piston and cylinder 34—35 and the connection therefrom to the lever 30 constitute a pressure-responsive device connected to the control member of the engine for controlling the steam supply thereto. For the sake of safety, I also provide a ball governor 36, responsive to the engine speed; but this ball governor is arranged to come into play only when the speed of the exhauster rises unduly high, so that it is merely a safety device and plays no part in the regular action.

The lower part of the cylinder 35 is connected to an air-supply pipe 40 and to an air-outlet pipe 41, both of which communicate with the cylinder 35 below the lowest point which the piston 34 can reach. The air-supply pipe 40 is connected to the outlet of a small blower 42, desirably a rotary positive-pressure blower, which is driven from the exhauster 16 in any suitable manner, as by a belt 43, so that the speeds of the blower and of the exhauster vary in proportion. Thus as the speed of the exhauster increases, the quantity of air discharged by the blower 42 is proportionately increased; which tends to lift the piston 34, to operate the lever 30 to cut down the steam-supply to the engine 17, and thus to lower the exhauster speed. In this way a governing action is obtained. This direct governing action by the movement of the piston 34 upon mere change in speed of the exhauster may be supplemented by a leakage valve 44 provided in the pipe 40, which valve 44 is connected by a link 45 to the lever 31 to allow greater or less leakage as the piston 34 rises and falls respectively. This produces a stabilizing action which I deem desirable, but it is not essential. The leakage valve 44 may be of any type, but for simplicity is illustrated as a simple inverted cone suspended in a leakage opening.

The air-outlet pipe 41 leads to other leakage valves, of which I have shown three. One of these is a leakage valve 46 which is closed and opened by a suction-main governor 47 as the pressure in the suction main just ahead of the coolers rises and falls respectively. The second is a leakage valve 48 controlled by one or more of the collecting-main governors 21, desirably the one farthest removed from the coolers 14. The third, which I consider desirable though it is not necessary, is a manually controlled leakage valve 49, for adjustment purposes. Thus the positions of all three leakage valves 46, 48, and 49, assist in controlling the position taken by the piston 34, and therefore assist in controlling the speed of the exhauster 16.

The suction-main governor 47 is shown as an inverted bell 50 dipping into water in a vessel 51, with a pipe 52 opening beneath the bell 50 and connected to the suction main 13 just ahead of the coolers 14. Desirably the bell 50 has a buoyancy chamber 53, so that its different positions correspond to slightly different pressures in the suction main. The bell 50 is swung from one end of a lever 54, from the other end of which is swung a counterweight 55; and this latter end of the lever 54 is connected to the leakage valve 46. This leakage valve 46 is shown as a balanced valve, having a valve stem 56 which projects through the end walls of a chamber 57 connected to the pipe 41, the stem at such end walls having cut-away portions 58 which allow the escape of air from the chamber 57 at a rate dependent upon the position of the stem 30. This balanced-valve construction, however, is not essential, and an ordinary cone valve may be used in place of it; and, similarly, balanced valves may be used instead of cone valves at the valves 44 and 48 if desired.

The valve 48, like the valve 44, is shown as a simple inverted cone 59 hung in an air-leakage opening, the cone conveniently being suspended from the bell-crank 25 of the collecting-main governor with which it is associated. As the pressure in the associated collecting main rises, to open the associated valve 20 in the crossover main, it also lifts the cone 59, to allow more leakage from the pipe 41, and vice versa.

In operation, the exhauster 16 draws gas from the various collecting mains through the various crossover mains into the suction main 13, and thence through the coolers 14 and exhauster main 15; and discharges such gas into the discharge main 60 for disposition in accordance with standard practice. The blower 42 blows air through the pipe 40 into the cylinder 35 beneath the piston 34, and more or less of the air thus supplied by the blower escapes through the various leakage valves 44, 46, 48, and 49, and around the piston, the amount escaping depending upon the settings of these leakage valves. The air pressure beneath such piston 34 raises the piston to a greater or less height, and thus moves the control lever 31 more or less. The blower keeps a constant pressure beneath the piston 34 for a constant speed of the exhauster, so long as the leakage valves remain in any constant position. If for any reason the speed of the exhauster increases or decreases, as because of a change in steam pressure, the speed of the blower correspondingly changes and the pressure beneath the piston is correspondingly increased or decreased; which tends to raise or lower the piston to move the control lever to compensate for such change in exhauster speed. This involves a compensation by a movement of the leakage valve 44, if that valve is provided.

If the pressure in the suction main 13 increases or decreases at the entrance to the coolers 14, the bell 50 of the suction-main governor rises or falls correspondingly, to increase or decrease the leakage at the leakage valve 46, to cause a fall or rise of the piston 34 and a consequent increase or decrease in the speed of the exhauster 16 to tend to return the pressure in the suction main toward normal.

However, this action by itself is too slow, and hunting of the governors tends to result. I largely avoid this hunting by the action of the leakage valve 48. When the pressure in the collecting main 11 farthest from the coolers rises or falls, with a resultant rise or fall of the bell 23 of the associated collecting-main governor and a corresponding opening or closing of the valve 20 of the associated crossover main 12, there is an increase or decrease of air leakage at the valve 48. This changed leakage is reflected almost instantly by a fall or rise of the piston 34, to cause an increase or decrease in the speed of the exhauster 16 to take care of the changed quantity of gas which is just starting into the system from the collecting main 11. Thus the exhauster 16 changes its speed before the change of pressure due to the changed quantity of gas reaches the suction-main governor 47, and the pressure at such suction-main governor is slightly lowered in advance of a rush of gas to it, in readiness for such rush when it comes. But the effect from the changed position of the leakage valve 48 is modified by a change which also occurs in the position of the leakage valve 46, for when the aforesaid increase in the exhauster speed results in a lowering of the pressure at the suction-main governor 47, the buoyant bell 50 of that governor will be drawn down somewhat to a new position corresponding to the decreased pressure, thus closing the leakage valve 46 somewhat, and thus decreasing the acceleration which the increased opening of the leakage valve 48 tended to produce in the exhauster 16. In this way, the action of the suction-main governor is modified by the action of the collecting-main governor, and the two are made to work in harmony, with a great reduction in governor interference and in hunting and swinging.

I claim as my invention:—

1. In a gas or coke-oven plant, the combination of one or more gas collecting mains, a suction main supplied from said collecting mains, an exhauster for drawing gas from said suction main, one or more collecting-main governors for controlling the flow of gas from the respective collecting mains to the suction main, and a governing device for the exhauster controlled jointly by the speed of the exhauster and the pressure in a collecting main.

2. In a gas or coke-oven plant, the combination of one or more gas collecting mains, a suction main supplied from said collecting mains, an exhauster for drawing gas from said suction main, one or more collecting-main governors for controlling the flow of gas from the respective collecting mains to the suction main, and a governing device for the exhauster controlled jointly by the pressure in a collecting main and the pressure in the suction main.

3. In a gas or coke-oven plant, the combination of one or more gas collecting mains, a suction main supplied from said collecting mains, an exhauster for drawing gas from said suction main, one or more collecting-main governors for controlling the flow of gas from the respective collecting mains to the suction main, and a governing device for the exhauster controlled jointly by the speed of the exhauster and the pressures in a collecting main and in the suction main.

4. In a gas or coke-oven plant, the combination of one or more gas collecting mains, a suction main supplied from said collecting mains, an exhauster for drawing gas from said suction main, and a governing device for the exhauster controlled jointly by the speed of the exhauster and the pressure in a collecting main.

5. In a gas or coke-oven plant, the combination of one or more gas collecting mains, a suction main supplied from said collecting mains, an exhauster for drawing gas from said suction main, and a governing device for the exhauster controlled jointly by the pressure in a collecting main and the pressure in the suction main.

6. In a gas or coke-oven plant, the combination of one or more gas collecting mains, a suction main supplied from said collecting mains, an exhauster for drawing gas from said suction main, and a governing device for the exhauster controlled jointly by the speed of the exhauster and the pressures in a collecting main and in the suction main.

7. In a gas or coke-oven plant, the combination of one or more gas collecting mains, a suction main supplied from said collecting mains, an exhauster for drawing gas from said suction main, a control member for controlling the speed of the exhauster, an air system including a pressure-responsive device connected to said control member to operate it, a blower arranged to operate at a speed proportional to that of the exhauster and supplying air to the pressure-responsive device, and means for controlling leakage from the air system supplied by said blower jointly by the pressures in a collecting main and in the gas-suction main.

8. In a gas or coke-oven plant, the combination of one or more gas collecting mains, a suction main supplied from said collecting mains, an exhauster for drawing gas from said suction main, a control member for controlling the speed of the exhauster, an air system including a pressure-responsive device connected to said control member to operate it, a blower arranged to operate at a speed proportional to that of the exhauster and supplying air to the pressure-responsive device, and means for controlling leakage from the air system supplied by said blower by the pressure in a collecting main.

In witness whereof, I have hereunto set my hand at Connersville, Indiana, this 16th day of March, A. D. one thousand nine hundred and twenty-five.

JOHN T. WILKIN.